United States Patent
Seregin et al.

(10) Patent No.: US 9,743,097 B2
(45) Date of Patent: Aug. 22, 2017

(54) SPATIAL MOTION VECTOR SCALING FOR SCALABLE VIDEO CODING

(71) Applicant: QUALCOMM Incorporated, San Diego, CA (US)

(72) Inventors: Vadim Seregin, San Diego, CA (US); Liwei Guo, San Diego, CA (US); Jianle Chen, San Diego, CA (US); Krishnakanth Rapaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 14/191,311

(22) Filed: Feb. 26, 2014

(65) Prior Publication Data
US 2014/0247879 A1    Sep. 4, 2014

Related U.S. Application Data

(60) Provisional application No. 61/771,742, filed on Mar. 1, 2013, provisional application No. 61/774,516, filed on Mar. 7, 2013.

(51) Int. Cl.
*H04N 19/30* (2014.01)
*H04N 19/33* (2014.01)
(Continued)

(52) U.S. Cl.
CPC ............ *H04N 19/33* (2014.11); *H04N 19/43* (2014.11); *H04N 19/513* (2014.11);
(Continued)

(58) Field of Classification Search
CPC ...................................................... H04N 19/33
(Continued)

(56) References Cited

U.S. PATENT DOCUMENTS 6,647,061 B1 * 11/2003 Panusopone ... H04N 21/234309
375/240.12
7,961,963 B2 * 6/2011 Sun ........................ H04N 19/56
341/50
(Continued)

FOREIGN PATENT DOCUMENTS

EP       2375751 A1    10/2011
TW    200706006 A     2/2007
(Continued)

OTHER PUBLICATIONS

Division free MB scaling; Chuang; Nov. 2011.*
(Continued)

*Primary Examiner* — William C Vaughn, Jr.
*Assistant Examiner* — Luis Perez Fuentes

(57) ABSTRACT

In one implementation, an apparatus is provided for encoding or decoding video information. The apparatus comprises a memory unit configured to store video information associated with a base layer and/or an enhancement layer. The apparatus further comprises a processor operationally coupled to the memory unit. In one embodiment, the processor is configured to determine a scaling factor based on spatial dimension values associated with the base and enhancement layers such that the scaling factor is constrained within a predetermined range. The processor is also configured to spatially scale an element associated with the base layer or enhancement layer using the scaling factor and a temporal motion vector scaling process.

51 Claims, 4 Drawing Sheets

(51) Int. Cl.
*H04N 19/513* (2014.01)
*H04N 19/43* (2014.01)
*H04N 19/55* (2014.01)
*H04N 19/52* (2014.01)
*H04N 19/61* (2014.01)

(52) U.S. Cl.
CPC ............ *H04N 19/55* (2014.11); *H04N 19/52* (2014.11); *H04N 19/61* (2014.11)

(58) Field of Classification Search
USPC ..................................................... 375/240.16
See application file for complete search history.

(56) References Cited

U.S. PATENT DOCUMENTS

| | | | |
|---|---|---|---|
| 7,995,656 B2* | 8/2011 | Chen | H04L 65/607 375/240.23 |
| 8,218,628 B2* | 7/2012 | Schwarz | H04N 19/0003 375/240.08 |
| 9,113,147 B2* | 8/2015 | Raveendran | H04N 5/144 |
| 9,131,247 B2* | 9/2015 | Yin | H04N 19/597 |
| 9,253,487 B2* | 2/2016 | Seregin | H04N 19/52 |
| 2009/0129474 A1 | 5/2009 | Pandit et al. | |
| 2010/0158128 A1 | 6/2010 | Kim et al. | |
| 2011/0116549 A1 | 5/2011 | Sun | |
| 2013/0188720 A1 | 7/2013 | Wang et al. | |
| 2014/0192880 A1* | 7/2014 | Deng | H04N 19/52 375/240.16 |
| 2014/0247879 A1* | 9/2014 | Seregin | H04N 19/33 375/240.16 |

FOREIGN PATENT DOCUMENTS

| | | |
|---|---|---|
| TW | 200820785 A | 5/2008 |
| WO | WO-2006099221 A2 | 9/2006 |
| WO | WO-2007064347 A2 | 6/2007 |
| WO | WO-2014139431 A1 | 9/2014 |

OTHER PUBLICATIONS

Inter-layer motion field mapping for scalable extension of HEVC; Xiaoyu; Mar. 12, 2014.*
Overview of the Scalable H.264 MPEG4-AVC Extension; Schwarz; Oct. 2006.*
Chuang T-D., et al., "Non-CE9: Division-free MV scaling", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-G223, Nov. 8, 2011 (Nov. 8, 2011), pp. 1-6, XP030110207.
International Search Report and Written Opinion—PCT/US2014/019083—ISA/EPO—Nov. 25, 2014.
Schwarz H et al., "Overview of the Scalable Extension of the H.264/MPEG-4 AVC Video Coding Standard", 21.JVT Meeting; 78.MPEG Meeting; Hangzhou, CN; (Joint Video Team of ISO / IEC / JTCI / SC29 / WG11 and ITU-T SG.16), No. JVT-U145, Oct. 20, 2006, XP030006791, ISSN:0000-0405, pp. 1-20.
Seregin (QUALCOMM) V: "TE5: Cross-verification of the test 5.2.5 on base layer MV candidate", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-L0207, Jan. 11, 2013 (Jan. 11, 2013), pp. 1-2, XP030113695.
Sullivan G.J., et al., "Overview of the High Efficiency Video Coding (HEVC) Standard," IEEE Transactions on Circuits and Systems for Video Technology, vol. 22, No. 12, Dec. 2012, pp. 1649-1668.
Xiu X., et al., "Inter-layer motion field mapping for the scalable extension of HEVC," Proceedings of SPIE-IS&T Electronic Imaging, (Feb. 21, 2013); SPIE vol. 8666, pp. 866604-1 to 866604-7.
Yang H, et al., "Description of scalable video coding technology proposal by Huawei Technologies", 102. MPEG Meeting; Oct. 15, 2012-Oct. 19, 2012; Shanghai; (Motion Picture Expert Group or ISO/IEC JTC1/SC29/WG11) No. m26607, Oct. 10, 2012 (Oct. 10, 2012), XP030054940.
Taiwan Search Report—TW103107143—TIPO—Dec. 14, 2015.

* cited by examiner

SPATIAL MOTION VECTOR SCALING FOR SCALABLE VIDEO CODING

CROSS REFERENCE TO RELATED APPLICATIONS

This application claims priority to U.S. Provisional No. 61/774,516, filed Mar. 7, 2013 and U.S. Provisional No. 61/771,742, filed Mar. 1, 2013, both of which are incorporated by reference in their entireties.

BACKGROUND

Field

This disclosure is related to the field of video coding and compression. In particular, it is related to High Efficiency Video Coding (HEVC) and its extensions, e.g., scalable video coding (SVC), multi-view video and 3D coding (MVC, 3DV), etc. In some embodiments, the disclosure relates to spatial motion vector scaling for SVC.

Description of the Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

In some situations it is desirable to spatially scale motion vectors from layers having a different spatial scalability than the layer being encoded or decoded. In other situations it is desirable to map the position of a video block from layer to an equivalent position in the layer being encoded or decoded. However, spatial scaling and inter-layer position mapping generally require increased processing costs due to arbitrary division operations performed to determine an appropriate scaling parameter.

SUMMARY OF THE DISCLOSURE

In general, this disclosure describes techniques related to scalable video coding (SVC). The techniques described below provide a mechanism to indicate whether inter-layer syntax prediction (including motion information) is allowed for specific base layer codecs (e.g., HEVC, etc.).

In one implementation, an apparatus is provided for encoding or decoding video information. The apparatus comprises a memory unit configured to store video information associated with a base layer and/or an enhancement layer. The apparatus further comprises a processor operationally coupled to the memory unit. In one embodiment, the processor is configured to perform spatial motion vector scaling of video information. For example, the processor may be configured to perform spatial motion vector scaling within a scalable video coding framework.

In on embodiment, an apparatus for coding video information is provided. The apparatus includes a memory unit and a processor. The memory unit is configured to store video information associated with a base layer, an enhancement layer, or both. The processor is operationally coupled to the memory unit and configured to: determine a scaling factor based on spatial dimension values associated with the base and enhancement layers such that the scaling factor is constrained within a predetermined range; and spatially scale an element associated with the base layer or enhancement layer using the scaling factor and a temporal motion vector scaling process or function.

In another embodiment, a method of decoding video information includes, with a processor coupled to a memory unit configured to store video information associated with a base layer, an enhancement layer, or both, determining a scaling factor based on spatial dimension values associated with the base and enhancement layers such that the scaling factor is constrained within a predetermined range. The method also includes spatially scaling an element associated with the base layer or enhancement layer using the scaling factor and a temporal motion vector scaling process. The method also includes decoding the video information using the spatially scaled element.

In another embodiment, a method of encoding video information includes, with a processor coupled to a memory unit configured to store video information associated with a base layer, an enhancement layer, or both, determining a scaling factor based on spatial dimension values associated with the base and enhancement layers such that the scaling factor is constrained within a predetermined range. The method also includes spatially scaling an element associated with the base layer or enhancement layer using the scaling factor and a temporal motion vector scaling process. The method also includes encoding the video information using the spatially scaled element.

In another embodiment, a non-transitory computer-readable medium includes instructions that when executed cause an apparatus to determine a scaling factor based on spatial dimension values associated with base and enhancement layers such that the scaling factor is constrained within a predetermined range. The instructions also cause the apparatus to spatially scale an element associated with the base layer or enhancement layer using the scaling factor and a temporal motion vector scaling process. The instructions also cause the apparatus to code the video information using the spatially scaled element.

In another embodiment, an apparatus is configured to code video information. The apparatus includes means for determining a scaling factor based on spatial dimension values associated with base and enhancement layers such that the scaling factor is constrained within a predetermined range. The apparatus also includes means for spatially scaling an element associated with the base layer or enhancement layer using the scaling factor and a temporal motion vector scaling process. The apparatus also includes means for coding the video information using the spatially scaled element.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
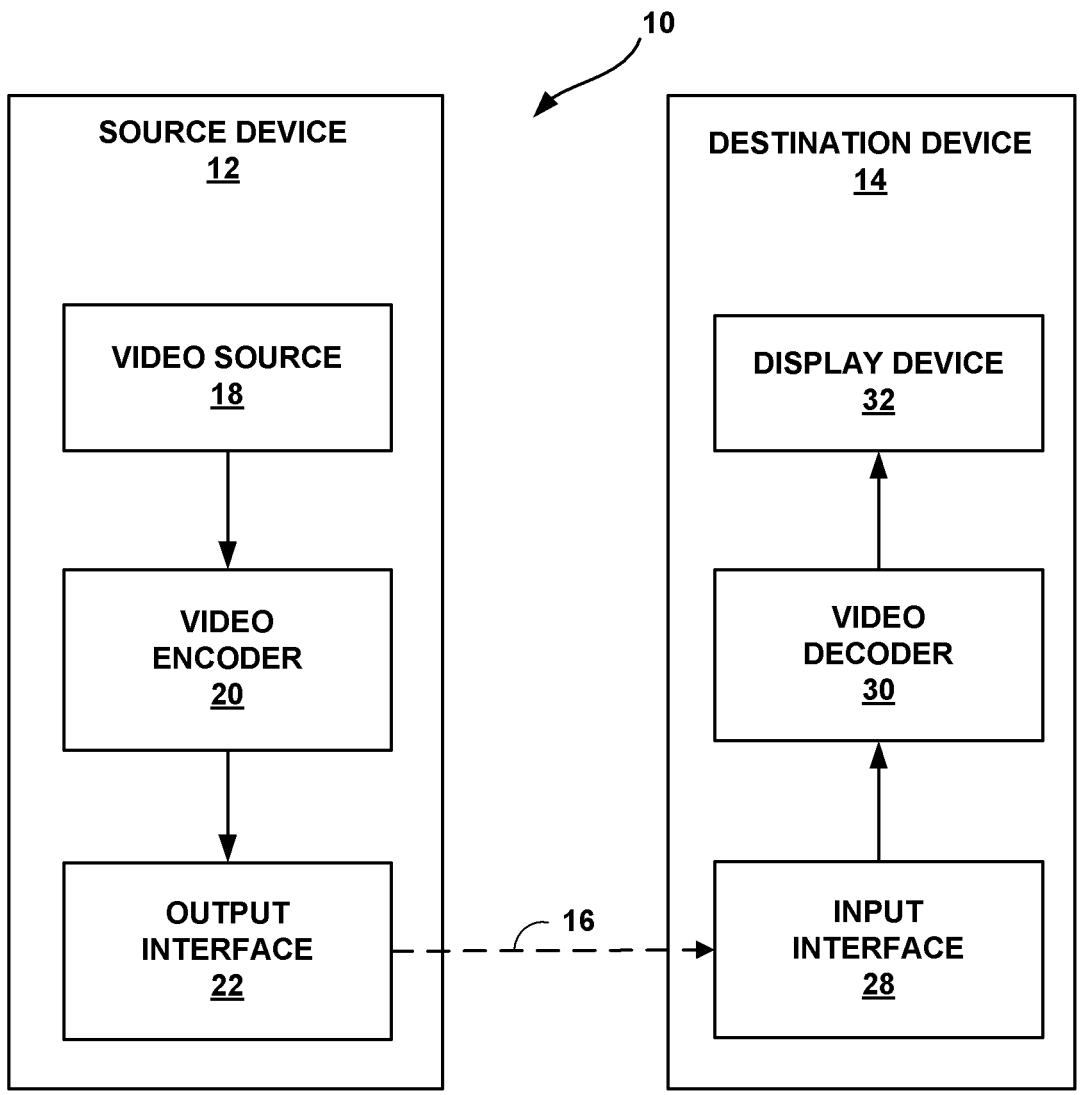
FIG. 1 is a block diagram illustrating an example video encoding and decoding system that may utilize techniques in accordance with aspects described in this disclosure.

The techniques described in this disclosure generally relate to scalable video coding (SVC) and multiview/3D video coding. For example, the techniques may be related to, and used with or within, a High Efficiency Video Coding (HEVC) scalable video coding (SVC, sometimes referred to as SHVC) extension. In an SVC extension, there could be multiple layers of video information. The layer at the very bottom level may serve as a base layer (BL), and the layer at the very top (or the highest layer) may serve as an enhanced layer (EL). The "enhanced layer" is sometimes referred to as an "enhancement layer," and these terms may be used interchangeably. The base layer is sometimes referred to as a "reference layer," (RL) and these terms may also be used interchangeably. All layers in between the base layer and the top layer may serve as either or both ELs or reference layers (RLs). For example, a layer in the middle may be an EL for the layers below it, such as the base layer or any intervening enhancement layers, and at the same time serve as a RL for the enhancement layers above it. Each layer in between the base layer and the top layer (or the highest layer) is may be used as a reference for inter-layer prediction by a higher layer and may use a lower layer as a reference for inter-layer prediction.

For simplicity, examples are presented in terms of just two layers: a BL and an EL; however, it should be well understood that the ideas and embodiments described below are applicable to cases with multiple layers, as well. In addition, for ease of explanation, the terms "frames" or "blocks" are often used. However, these terms are not meant to be limiting. For example, the techniques described below can be used with any of a variety of video units, including but not limited to pixels, blocks (e.g., CU, PU, TU, macroblocks, etc.), slices, pictures, etc.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The latest joint draft of SVC and MVC is described in "Advanced video coding for generic audio-visual services," ITU-T Recommendation H.264, March 2010.

In addition, there is a new video coding standard, High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent High Efficiency Video Coding (HEVC) text specification draft is available from http://phenix.int-evry.fr/jct/doc_end_user/documents/12_Geneva/wg11/JCTVC-L1003-v13.zip. Another recent Working Draft (WD) of HEVC, and referred to as HEVC WD9, is available at http://phenix.int-evry.fr/jct/doc_end_user/documents/11_Shanghai/wg11/JCTVC-K1003-v13.zip. Another working draft of HEVC, referred to as HEVC WD8 (or WD8) is available at http://phenix.int-evry.fr/jct/doc_end_user/documents/10_Stockholm/wg11/JCTVC-J1003-v8.zip. Another Working Draft of HEVC, and referred to as HEVC WD7 hereinafter, is available from http://phenix.int-evry.fr/jct/doc_end_user/documents/9_Geneva/wg11/JCTVC-I1003-v5.zip. All of these documents are incorporated by reference in their entireties.

In SVC, video information may be provided as multiple layers. The layer at the very bottom level can just serve as a base layer (BL) and the layer at the very top level can serve as an enhancement layer (EL). All the layers between the top and bottom layers may serve as both enhancement layers and base layers. For example, a layer in the middle can be an EL for the layers below it, and at the same time as a BL for the layers above it. For simplicity of description, we can assume that there are two layers, a BL and an EL, in illustrating the techniques described below. However, all the techniques described herein are applicable to cases with multiple (more than two) layers, as well.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information (including motion vectors) of the base layer to predict motion in the enhancement layer. Inter-layer residual prediction uses the residue of the base layer to predict the residue of the enhancement layer.

In some embodiments of inter-layer motion prediction, the motion data (including motion vectors) of the base layer (e.g., for the co-located block) may be used to predict the current block in the enhancement layer. For example, while coding a video unit in an enhancement layer, video coders can use information from a reference layer to obtain additional motion compensation data that can be used to identify additional hypotheses. As these additional hypotheses are implicitly derived from data already existing data in a video bitstream, additional performance in video coding can be gained with little or no additional cost in bitstream size. In another example, motion information from spatially neighboring video units can be used to locate additional hypothesis. The derived hypothesis can then be averaged or otherwise combined with explicitly encoded hypothesis to generate a better prediction of a value of a video unit. In certain situations, such as when the spatial resolution of the base (or reference) layer is different than the spatial resolution of the current block's layer, the base layer motion information is spatially scaled prior to being used to encode or decode the current block. Likewise, the position of a block in a base (or reference) layer may be determined by inter-layer position mapping, as described below, when the layer has a different spatial resolution than the current block's layer.

Spatial Motion Vector Scaling

A motion vector (MV) from a base layer can be used as a MV candidate in at least Merge or AMVP modes. Because the base layer and enhancement layers can potentially have different resolutions, the MV from the base layer may need to be scaled according to the resolution difference before being used as inter-layer MV prediction candidates. In one embodiment, such scaling is expressed by:

$$MV = \{MVx, MVy\},$$

$$\begin{cases} MVx = blMVx \times \frac{elW}{blW} \\ MVy = blMVy \times \frac{elH}{blH} \end{cases}$$

where el indicates enhancement layer, bl indicates base layer, W indicates width, and H indicates height.

The above formulas are provided for illustrative purposes, and similar formulas can be used. For example, similar formulas may be use where, for example, rounding offset is added.

Inter-Layer Position Mapping

Position mapping between a base layer picture and an enhancement layer picture is performed for inter-layer texture and/or syntax prediction. For example, in inter-layer texture prediction, for a pixel at position (x, y) of the enhancement layer (which can be referred to as PEL(x,y)), a corresponding position (blx, bly) may be derived. Therefore, a pixel value at (blx, bly) of the base layer, which can be referred to as PBL(blx, bly), can be used to predict the value of PEL(x,y). The position mapping can be expressed as:

$$\begin{cases} blx = x \times \frac{blW}{elW} \\ bly = y \times \frac{blH}{elH} \end{cases}$$

The above formulas are used for illustrative purpose, similar formulas can be used where, for example, rounding offset can be added. If the base layer picture and enhancement layer picture have different cropping, cropping parameters can be integrated in the formula. However, one disadvantage of using the above formulae is that a division operation is required for arbitrary base and enhancement layer scalability aspect ratios. Such a division operation is computationally expensive and requires extensive computing resources and/or larger memory and bandwidth requirements, as discussed in greater detail below.

It has been proposed that the Temporal Motion Vector Predictor (TMVP) scaling function available in the HEVC standard may be used for base layer MV scaling. The input parameter for this function is the variable scaled, calculated as $$iScaleBase = (1 \ll 8) * \frac{elW}{blW},$$

which is equivalent to iScaleBase=256×elW/blW (where elW and blW correspond to the widths of the enhancement layer picture and base layer picture, respectively). The expression x<<y refers to a left shifting of the binary representation of the number x by y bits, which is equivalent to dividing the number x by $2^y$. Similarly, the expression x>>y refers to a right shifting of the binary representation of the number x by y bits, which is equivalent to multiplying the number x by $2^y$. For no scaling, e.g., when the base layer and enhancement layer picture sizes are equal, the input parameter iScaleBase is equal 256. For scalability of 2× (e.g., when the width of the enhancement layer picture is twice the width of the base layer picture), the input parameter iScaleBase is equal to 512, and for 1.5× the input parameter iScaleBase is equal to 384. This input parameter can be calculated once per sequence. However, as mentioned above, division is required with an arbitrary divider, which can increase the cost and/or decrease the efficiency of the encoding and decoding process.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 can provide the video data to the destination device 14 via a computer-readable medium 16. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. Source device 12 and destination device 14 may be equipped for wireless communication.

Destination device 14 may receive the encoded video data to be decoded via computer-readable medium 16. Computer-readable medium 16 may comprise a type of medium or device capable of moving the encoded video data from source device 12 to destination device 14. For example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or other digital storage media for storing video data. The storage device may correspond to a file server or another intermediate storage device that may store the encoded video generated by source device 12. Destination device 14 may access stored video data from the storage device via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a computer-readable medium 16.

Computer-readable medium 16 may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, computer-readable medium 16 may be understood to include one or more computer-readable media of various forms.

Input interface 28 of destination device 14 can receive information from computer-readable medium 16. The information of computer-readable medium 16 may include syntax information defined by video encoder 20, which can be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2:
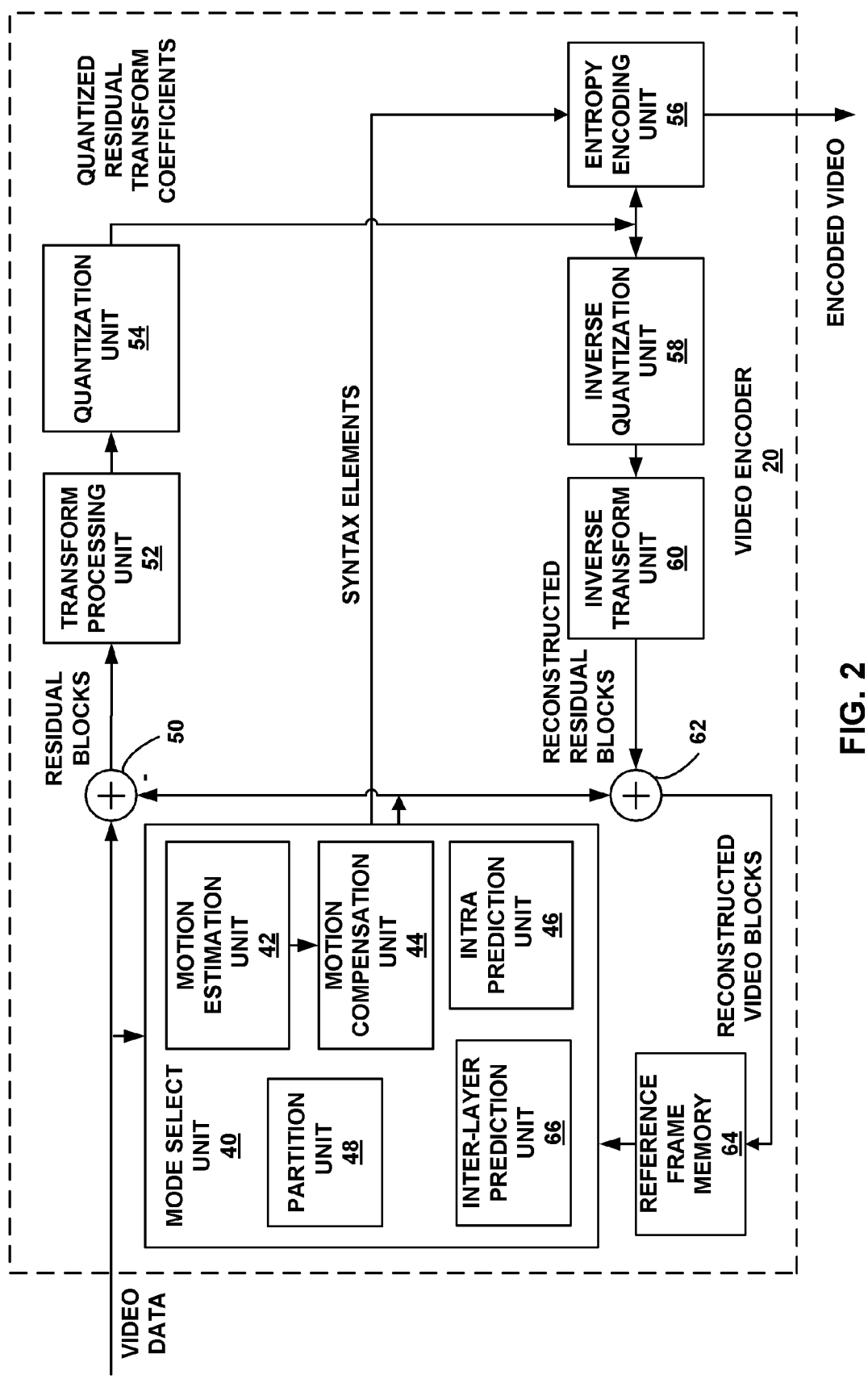
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure, including but not limited to the methods of performing spatial scaling using a temporal scaling function described in greater detail below with respect to FIG. 4. As one example, inter-layer prediction unit 66 (when provided) may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48.

For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 may include an inter-layer prediction unit 66. Inter-layer prediction unit 66 is configured to predict a current block (e.g., a current block in the EL) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping using a temporal scaling function may be performed by the inter-layer prediction unit 66, as described in greater detail below.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms can also be used.

Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video Decoder

Figure 3:
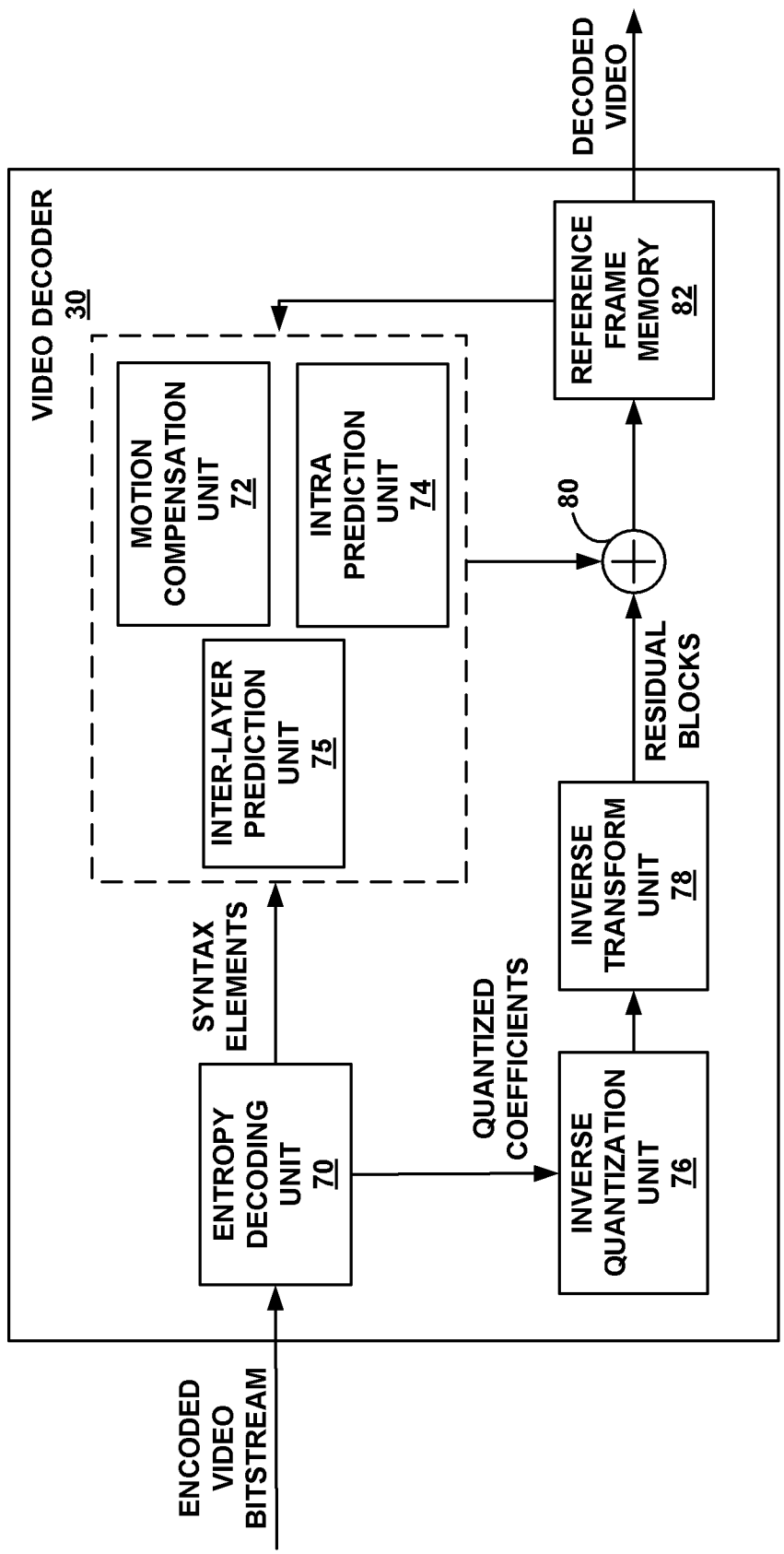
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including but not limited to the methods of performing spatial scaling using a temporal scaling function described in greater detail below with respect to FIG. 4. As one example, inter-layer prediction unit 75 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inter-layer prediction unit 75, inverse quantization unit 76, inverse transformation unit 78, reference frame memory 82 and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. The inter-layer prediction unit 75 is configured to predict a current block (e.g., a current block in the EL) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping may be performed by the inter-layer prediction unit 75 using a temporal scaling function, as described in greater detail below.

Inverse quantization unit 76 inverse quantizes, e.g., dequantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse DST, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Motion Vector Scaling

As discussed above, in some embodiments, a motion vector is scaled as part of an encoding or decoding process. For example, motion vectors from a layer having a different spatial resolution than the layer of the current block may be scaled prior to use to encode or decode the current block. In one embodiment, a processor is configured to implement a method of motion vector scaling. The first step of the method can be to change the input parameter iScaleBase, discussed above, to:

$$iScaleBase = \frac{elH}{blH} \times 256.$$

An iScaleBase determined using a ratio of the enhancement and base layer height values provides advantages over using a ratio of the enhancement and base layer width values because the height value is usually smaller than width.

As another embodiment of the method for the input parameter calculation, an offset could be added to the equation as follows:

$$iScaleBase = \frac{elW \times 256 + \text{offset}}{blW},$$

where offset can be blW/2 which corresponds to a 0.5 rounding offset value. In another embodiment that provides a rounding offset, the input parameter can be:

$$\left(\frac{blW}{2} - 1\right).$$

As discussed above, these input parameters may be used as the input to a TMVP temporal scaling function that already exists under the HEVC standard to perform spatial scaling. Using the existing TMVP temporal scaling function to perform spatial scaling provides the advantage of allowing spatial scaling without introducing a new, specific scaling function to the HEVC standard or its extensions (such as the SHVC extension).

Scalability Ratio for Horizontal and Vertical Directions

If it is desired that the scalability ratio should not be the same in horizontal and vertical directions, then the methods described above may be extended by introducing two scale parameters iScaleBaseX and iScaleBaseY for horizontal and vertical directions, respectively. In one embodiment:

$$iScaleBaseX = \frac{elW * N}{blW},$$

$$iScaleBaseY = \frac{elH * N}{blH},$$

where the scaled factor, N, can be an integer, such as 256. In another example, an offset may be added to the numerator of each scale parameter.

In this embodiment, the TMVP scaling function will have two input parameters, iScaleBaseX and iScaleBaseY, and the TMVP scaling method may be applied for each motion vector component independently. For example, the TMVP function may be called twice; the first time using iScaleBaseX as an input, and the second time using iScaleBaseY as an input.

Furthermore, all the methods and techniques described below in terms of one scalability ratio can similarly be applied to horizontal and vertical scalability ratios independently. For example, similar methods may be performed for the position mapping described below, where two scaling parameters (e.g., one for horizontal direction and one for vertical direction) can be introduced. For the horizontal parameter calculation, elW and blW are used, and for the vertical parameter calculation, elH and blH are used.

Data Range Reduction for Division

In some embodiments, to reduce computational, bandwidth, and/or memory costs, the division operation of the iScaleBase parameter is limited by restricting the divider within a certain (e.g., predetermined) range. By doing so, the division operation can be implemented with a smaller sized look-up table.

The values of the base layer and the enhancement layers width or height are reduced such that the base layer width will be in a range of (0, blMax), where blMax is the maximum possible base layer width values and it can be connected to the size of the look-up table. The smaller this value, the smaller the look-up table that can be used. An optimal threshold between the look-up table size and accuracy can be found by changing the blMax value.

For a given number blMax, the number of shifts (or the divider of power of 2) is calculated for the base layer width or height, to make the value in the range of (0, blMax). In one embodiment, the shifts number is referred to as N, and the corresponding divider of the base layer is $2^N$. The power of two may be utilized to simplify the implementation, as division-by-two operations may performed by bit shifting. However in other embodiments, the value can be any number smaller than the base layer width or height.

Next, the base layer and enhancement layer are right-shifted by N to keep the same scalability ratio. The final input parameter calculation can be expressed as:

$i\text{ScaleBase}=((elW>>N)<<8)/(blW>>N)$.

A variant formula can be used to reduce the rounding error:

$i\text{ScaleBase}=((elW<<8)>>N)/(blW>>N)$, where (blW>>N) is in a range (0, blMax), having upper limit, and left-shift by 8 is used to normalize the input parameter of the TMVP scaling function (e.g., scale of 1 corresponds to 256).

In addition, rounding offset can be added to the above formula. For example, the offset can be added as:

$i\text{ScaleBase}=(((elW>>N)+\text{offset}))<<8)/(blW>>N)$, where offset can be (blW>>(N+1)), which corresponds to 0.5 rounding offset value. Another variant for rounding offset can be (blW>>(N+1))−1, in which rounding towards zero is used.

The following variant can be used to reduce the rounding error for a reduced data range of elW:

$i\text{ScaleBase}=(((elW<<8)>>N)+\text{offset}))/(blW>>N)$.

Similarly the offset can be set to (blW>>(N+1)), corresponding to 0.5 rounding offset value, or (blW>>(N+1))−1, corresponding to rounding towards zero. The variable blW and elW in all above equations can be replaced by blH and elH.

C++ Implementation

One example of a C++ implementation is as follows:

```
Int blMax = 128;
Int N = 0;
Int blWidth = iBWidth;
while( blWidth > blMax )
{
    blWidth >>= 1;
    N++;
}
assert( ( iBWidth >> N ) < blMax );
iScaleBase = ( ( iEWidth >> N ) << 8 ) / ( iBWidth >> N );
``` where iBWidth is the base layer width, iEWidth is the enhancement layer width. Although this embodiment omits rounding offset, rounding offset may be included, as discussed above.

Avoiding Division Operation

For easier conversion from a division operation to a look-up table access function, the input parameter calculation can be implemented as follows:

$$i\text{ScaleBase} = elW * \frac{2^K}{blW} \times 256 \gg K$$

In another embodiment, an offset is added:

$$i\text{ScaleBase} = elW * \frac{2^K + \text{offset}}{blW} \times 256 \gg K$$

where offset can be set to blW/2

$$\left(\frac{blW}{2} - 1\right),$$

or as discussed above. In another embodiment:

$$i\text{ScaleBase} = elW * \frac{2^K + \text{offset}}{blW} \gg (K - 8)$$

where K is the pre-defined constant value (e.g., one example value of K is 16). With this expression, the division $$\frac{2^K + \text{offset}}{blW}$$

can be easily replaced by a look-up table.

The methods described above can be applied to the methods of this "Avoiding Division Operation" section, as well. For example, in one embodiment, blW is right-shifted by N bits such that the shifted value of (blW>>N) is in a pre-defined range (0, blMax). The value of (2^K/(blW>>N)) is stored in a look-up table for (blW>>N) in the range of (0, blMax).

The calculation can be performed as:

$$i\text{ScaleBase} = (elW \gg N) * \frac{2^K + \text{offset}}{blW \gg N} \gg (K - 8)$$

In another embodiment:

$$i\text{ScaleBase} = elW * \frac{2^K + \text{offset}}{blW \gg N} \gg (K + N - 8)$$

where offset can be set to (blW>>(N+1) or ((blW>>(N+1)−1) as mentioned above.

The variable blW and elW in all of the above equations can be replaced by blH and elH, as mentioned above.

Improvement of Interlayer Position Mapping

Simplifying the division operation can be applied to other elements where the division according to the scalability aspect ratio is used. For example, it might be also necessary to divide by the base layer width or height to locate the co-located pixel position in the base layer picture. In this case, the same technique or methods discussed above and used to scale a motion vector, can be applied to calculate the position of a co-located pixel or co-located block in the base layer.

As mentioned above, the x and y coordinates of a pixel (or block) in a base layer (blx, bly) can be expressed as:

$$\begin{cases} blx = x \times \dfrac{blW}{elW} \\ bly = y \times \dfrac{blH}{elH} \end{cases}$$

Where x and y correspond to the coordinates of the pixel in the enhancement layer, and blW, elW, blH, and elH correspond to the base and enhancement layer widths and heights, respectively. The above equation can be modified as follows:

$$blx = (x * iScaleBase' + offset1) >> M$$

$$bly = (y * iScaleBase' + offset1) >> M$$

where iScaleBase' can be calculated as $$iScaleBase' = \frac{blW}{elW} * (1 \ll M)$$

All the methods mentioned above can be applied to the above equation to reduce the cost of the divide-by-elW operation. Also, any one of the offsets, described above, can be applied to define the offset1, above.

Look-Up Table Implementation

In another embodiment, the division operation is removed by replacing it with a look-up table that is based on range reduced values of base layer and enhancement layer widths and/or heights.

In one embodiment, the values of the base layer and the enhancement layer width and/or height are reduced to ensure that they will fall within a range of (0, blMax) and (0,elMax), respectively. blMax is the maximum possible base layer width and/or height value and elMax is maximum possible enhancement layer width and/or height value. Both blMax and elMax may be connected to or related to the size of the look-up table. The smaller these values, the smaller the look-up table that can be used.

This approach provides a tradeoff between computation complexity and accuracy of scaling. An optimal threshold between the look-up table size and accuracy can be found by changing blMax and elMax values.

For given number blMax, the number of shifts (or the divider of power of 2) may be calculated for the base and/or enhancement layer width or height to make the value in the range of (0, blMax) and/or (0,elMax) respectively. For example, the shifts number may be represented as Nb, and the corresponding divider of the base layer will be $2^{Nb}$. The same techniques and methods may be applied to an enhancement layer, also. The power of 2 may be chosen due to easy operation, since the division can be performed by shifts; however, in other embodiments it can be any number smaller than the base layer width or height.

The base layer and enhancement layers are subsequently right-shifted by Nb and Ne to maintain the same scalability ratio. The final input parameter calculation can be expressed as:

$$iScaleBase = LookUpTable[(iEWidth >> N_e)] [(iBWidth >> N_b)].$$

The LookUpTable function may be implemented in many ways based on rounding accuracy, rate distortion cost, etc. In addition, the variables iEWidth and iBWidth in all above equations can be replaced by iEHeight and iBHeight.

Figure 4:
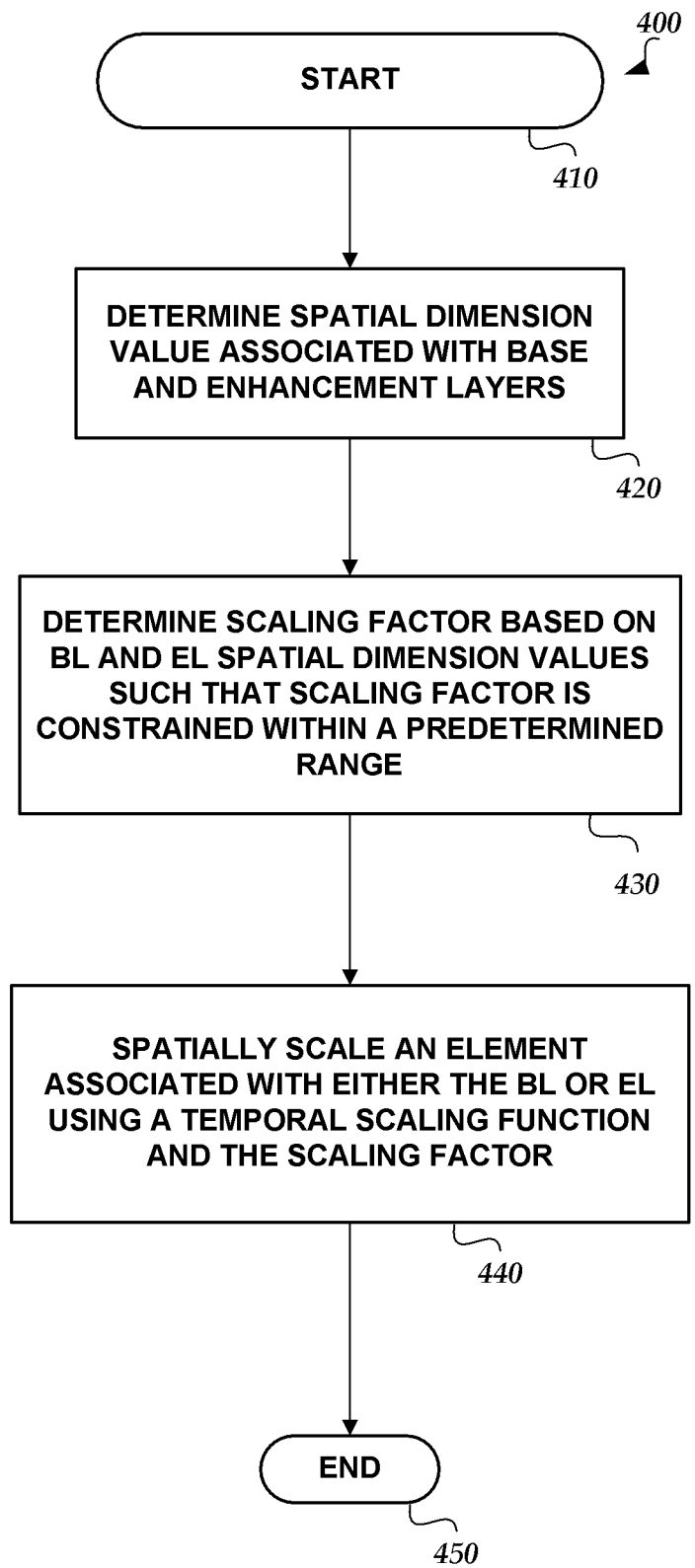
FIG. 4 is a flowchart illustrating an embodiment of a method of performing spatial scaling using a temporal scaling function according to aspects of this disclosure.

FIG. 4 illustrates one embodiment of a method of performing spatial scaling using a temporal scaling function that may be performed by the video encoder 20 of FIG. 2 or the video decoder 30 of FIG. 3. The method 400 may be performed by any one or more of the motion estimation unit 42, motion compensation unit 44, intra prediction unit 46, and inter-layer prediction unit 66 of the video encoder 20 of FIG. 2. In another embodiment, the method 400 may be performed by any one or more of the motion compensation unit 72, intra prediction unit 74, and inter-layer prediction unit 75 of the decoder of FIG. 3.

The method 400 begins at block 410. At block 420, base layer (BL) and enhancement layer (EL) spatial dimension values are determined. For example, the width of the base layer picture and the width of the enhancement layer picture may be determined at block 420. In another embodiment, the height of the base layer picture and the height of the enhancement layer picture are determined at block 420. In another embodiment, the dimension is the same dimension in both the BL and EL.

At block 430, a scaling factor is determined based on the BL and EL spatial dimension values such that the scaling factor is constrained within a predetermined range. For example, the BL dimension value can be constrained to fall within the range of (0, blMax), as discussed above, and the EL dimension value can be constrained to fall within the range of (0,elMax), as discussed above. In one embodiment, the scaling factor is constrained by multiplying a ratio of the EL and BL dimension values by a first value and dividing the product by a second value. In one embodiment, the second value is a power of 2, such that the division may be performed by a right-shift operation. The scaling factor is constrained such that it may be used with a pre-existing motion vector scaling process or function, such as the TMVP scaling process provided HEVC specification. In one embodiment, the scaling factor is constrained by using a clipping function.

At block 440 an element associated with either the EL or BL is spatially scaled using a temporal scaling function and the scaling factor. For example, in one embodiment, the element corresponds to a motion vector associated with a video block in the BL. In another embodiment, the element corresponds to the spatial location (or position) of a pixel or video block in the BL. The method 400 continues to block 450 and ends.

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image. As discussed above, motion information from the reference layer can be used to identify additional implicit hypothesis when encoding or decoding a video unit in the enhancement layer, in accordance with aspects of the disclosure. This can provide greater coding efficiency for a 3D video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

What is claimed is:

1. An apparatus for decoding video information, the apparatus comprising:
   a memory configured to store video data associated with a base layer (BL), an enhancement layer (EL), or both, wherein the BL comprises one or more BL pictures having a first BL spatial dimension value and a second BL spatial dimension value, and the EL comprises one or more EL pictures having a first EL spatial dimension value and a second EL spatial dimension value; and
   a processor operationally coupled to the memory and configured to:
      determine (i) a first scaling factor based on the first BL spatial dimension value and the first EL spatial dimension value and (ii) a second scaling factor based on the second BL spatial dimension value and the second EL spatial dimension value, wherein the first scaling factor is different from the second scaling factor;
      spatially scale a first component of an element associated with the BL using the determined first scaling factor as an input to a scaling function, wherein the scaling function is configured to temporally scale motion vectors to generate temporal motion vector predictors (TMVPs);
      spatially scale a second component of the element associated with the BL using the determined second scaling factor as an input to the scaling function; and
      decode at least a portion of the EL using the spatially scaled first and second components of the element.

2. The apparatus of claim 1, wherein the first and second BL spatial dimension values comprise a BL width and a BL height, respectively, and the first and second EL spatial dimension values comprise an EL width and an EL height, respectively.

3. The apparatus of claim 1, wherein the first scaling factor comprises a product of (a) a ratio of the first EL spatial dimension value to the first BL spatial dimension value and (b) a predetermined value, and the second scaling factor comprises a product of (a) a ratio of the second EL spatial dimension value to the second BL spatial dimension value and (b) the predetermined value.

4. The apparatus of claim 3, wherein the predetermined value is 256.

5. The apparatus of claim 1, wherein the first EL spatial dimension value comprises the sum of (a) an EL width dimension ,value multiplied by a predetermined value and (b) an offset value, and wherein the first BL spatial dimension value comprises a BL width dimension value.

6. The apparatus of claim 5, wherein the offset value is one half of the BL width dimension value.

7. The apparatus of claim 5, wherein the offset value is one less than one half of the BL width dimension value.

8. The apparatus of claim 1, wherein the first EL spatial dimension value and the first BL spatial dimension value are within a range from 0 to a maximum width dimension value of the BL.

9. The apparatus of claim 1, wherein the processor is further configured to encode the video data in a bitstream using the spatially scaled first and second components of the element.

10. The apparatus of claim 1, wherein the processor is further configured to decode the video data in a bitstream using the spatially scaled first and second components of the element.

11. The apparatus of claim 1, wherein the element comprises a motion vector.

12. The apparatus of claim 1, wherein the element comprises a spatial position of a pixel or video block.

13. The apparatus of claim 1, wherein the apparatus comprises a device selected from the group consisting of a digital television, a digital direct broadcast system, a wireless broadcast system, a personal digital assistant (PDA), a laptop computer, a desktop computer, a tablet computer, an e-book reader, a digital camera, a digital recording device, a digital media player, a video gaming device, a video game console, a cellular telephone, a satellite radio telephone, a smart phone, a video teleconferencing device, and a video streaming device.

14. The apparatus of claim 1, wherein the processor is further configured to determine the first and second scaling factors without performing a division operation.

15. The apparatus of claim 1, wherein the processor is further configured to determine the first and second scaling factors by using a lookup table for each division operation associated with the first and second scaling factors.

16. The apparatus of claim 1, wherein the second BL spatial dimension value and the second EL spatial dimension value are within a range from 0 to a maximum width dimension value of the BL.

17. The apparatus of claim 16, wherein the second BL spatial dimension value is a height of the one or more BL pictures and the second EL spatial dimension value is a height of the one or more EL pictures.

18. A method of decoding video information, the method comprising:
  with a processor coupled to a memory configured to store video data associated with a base layer (BL), an enhancement layer (EL), or both, wherein the BL comprises one or more BL pictures having a first BL spatial dimension value and a second BL spatial dimension value, and the EL comprises one or more EL pictures having a first EL spatial dimension value and a second EL spatial dimension value,
  determining (i) a first scaling factor based on the first BL spatial dimension value and the first EL spatial dimension value and (ii) a second scaling factor based on the second BL spatial dimension value and the second EL spatial dimension value, wherein the first scaling factor is different from the second scaling factor;
  spatially scaling a first component of an element associated with the BL using the determined first scaling factor as an input to a scaling function, wherein the scaling function is configured to temporally scale motion vectors to generate temporal motion vector predictors (TMVPs);
  spatially scaling a second component of the element associated with the BL using the determined second scaling factor as an input to the scaling function; and
  decoding the video data using the spatially scaled first and second components of the element.

19. The method of claim 18, wherein the first and second BL spatial dimension values comprise a BL width and a BL height, respectively, and the first and second EL spatial dimension values comprise an EL width and an EL height, respectively.

20. The method of claim 18, wherein the first scaling factor comprises a product of (a) a ratio of the first EL spatial dimension value to the first BL spatial dimension value and (b) a predetermined value, and the second scaling factor comprises a product of (a) a ratio of the second EL spatial dimension value to the second BL spatial dimension value and (b) the predetermined value.

21. The method of claim 20, wherein the predetermined value is 256.

22. The method of claim 18, wherein the first EL spatial dimension value comprises the sum of (a) an EL width dimension value multiplied by a predetermined value and (b) an offset value, and wherein the first BL spatial dimension value comprises a BL width dimension value.

23. The method of claim 22, wherein the offset value is one half of the BL width dimension value.

24. The method of claim 22, wherein the offset value is one less than one half of the BL width dimension value.

25. The method of claim 18, wherein the first EL spatial dimension value and the first BL spatial dimension value are within a range from 0 to a maximum width dimension value of the BL.

26. The method of claim 18, wherein the element comprises a motion vector.

27. The method of claim 18, wherein the element comprises a spatial position of a pixel or video block.

28. The method of claim 18, wherein determining the first and second scaling factors comprises determining the first and second scaling factors without performing a division operation.

29. The method of claim 18, wherein determining the first and second scaling factors comprises determining the first and second scaling factors by using a lookup table for each division operation associated with the first and second scaling factors.

30. The method of claim 18, wherein the second BL spatial dimension value and the second EL spatial dimension value are within a range from 0 to a maximum width dimension value of the BL.

31. The method of claim 30, wherein the second BL spatial dimension value is a height of the one or more BL pictures and the second EL spatial dimension value is a height of the one or more EL pictures.

32. A method of encoding video information, the method comprising:
  with a processor coupled to a memory configured to store video data associated with a base layer (BL), an enhancement layer (EL), or both, wherein the BL comprises one or more BL pictures having a first BL spatial dimension value and a second BL spatial dimension value, and the EL comprises one or more EL pictures having a first EL spatial dimension value and a second EL spatial dimension value,
  determining (i) a first scaling factor based on the first BL spatial dimension value and the first EL spatial dimension value and (ii) a second scaling factor based on the second BL spatial dimension value and the second EL spatial dimension value, wherein the first scaling factor is different from the second scaling factor;
  spatially scaling a first component of an element associated with the BL using the determined first scaling factor as an input to a scaling function, wherein the scaling function is configured to temporally scale motion vectors to generate temporal motion vector predictors (TMVPs);

spatially scaling a second component of the element associated with the BL using the determined second scaling factor as an input to the scaling function; and encoding the video data using the spatially scaled first and second components of the element.

33. The method of claim 32, wherein the first and second BL spatial dimension values comprise a BL width and a BL height, respectively, and the first and second EL spatial dimension values comprise an EL width and an EL height, respectively.

34. The method of claim 32, wherein the first scaling factor comprises a product of (a) a ratio of the first EL spatial dimension value to the first BL spatial dimension value and (b) a predetermined value, and the second scaling factor comprises a product of (a) a ratio of the second EL spatial dimension value to the second BL spatial dimension value and (b) the predetermined value.

35. The method of claim 34, wherein the predetermined value is 256.

36. The method of claim 32, wherein the first EL spatial dimension value comprises the sum of (a) an EL width dimension value multiplied by a predetermined value and (b) an offset value, and wherein the first BL spatial dimension value comprises a BL width dimension value.

37. The method of claim 36, wherein the offset value is one half of the BL width dimension value.

38. The method of claim 36, wherein the offset value is one less than one half of the BL width dimension value.

39. The method of claim 32, wherein the first EL spatial dimension value and the first BL spatial dimension value are within a range from 0 to a maximum width dimension value of the BL.

40. The method of claim 32, wherein the element comprises a motion vector.

41. The method of claim 32, wherein the element comprises a spatial position of a pixel or video block.

42. The method of claim 32, wherein determining the first and second scaling factors comprises determining the first and second scaling factors without performing a division operation.

43. The method of claim 32, wherein determining the first and second scaling factors comprises determining the first and second scaling factors by using a lookup table for each division operation associated with the first and second scaling factors.

44. The method of claim 32, wherein the second BL spatial dimension value and the second EL spatial dimension value are within a range from 0 to a maximum width dimension value of the BL.

45. The method of claim 44, wherein the second BL spatial dimension value is a height of the one or more BL pictures and the second EL spatial dimension value is a height of the one or more EL pictures.

46. A non-transitory computer-readable medium comprising instructions that when executed cause an apparatus to:
determine (i) a first scaling factor based on a first base layer (BL) spatial dimension value of a BL picture in a BL and a first enhancement layer (EL) spatial dimension value of an EL picture in an EL and (ii) a second scaling factor based on a second BL spatial dimension value of the BL picture and a second EL spatial dimension value of the EL picture, wherein the first scaling factor is different from the second scaling factor;

spatially scale a first component of an element associated with the BL using the determined first scaling factor as an input to a scaling function, wherein the scaling function is configured to temporally scale motion vectors to generate temporal motion vector predictors (TMVPs);

spatially scale a second component of the element associated with the BL using the determined second scaling factor as an input to the scaling function; and decode at least a portion of the EL using the spatially scaled first and second components of the element.

47. The medium of claim 46, wherein the first scaling factor comprises a product of (a) a ratio of the first EL spatial dimension value to the first BL spatial dimension value and (b) a predetermined value, and the second scaling factor comprises a product of (a) a ratio of the second EL spatial dimension value to the second BL spatial dimension value and (b) the predetermined value.

48. The medium of claim 46, wherein the instructions cause the apparatus to determine the first and second scaling factors without performing a division operation.

49. An apparatus configured to decode video information, the apparatus comprising:
means for determining (i) a first scaling factor based on a first base layer (BL) spatial dimension value of a BL picture in a BL and a first enhancement layer (EL) spatial dimension value of an EL picture in an EL and (ii) a second scaling factor based on a second BL spatial dimension value of the BL picture and a second EL spatial dimension value of the EL picture, wherein the first scaling factor is different from the second scaling factor;

means for spatially scaling a first component of an element associated with the BL using the determined first scaling factor as - an input to a scaling function, wherein the scaling function is configured to temporally scale motion vectors to generate temporal motion vector predictors (TMVPs);

means for spatially scaling a second component of the element associated with the BL using the determined second scaling factor as an input to the scaling function; and means for decoding at least a portion of the EL using the spatially scaled first and second components of the element.

50. The apparatus of claim 49, wherein the first scaling factor comprises a product of (a) a ratio of the first EL spatial dimension value to the first BL spatial dimension value and (b) a predetermined value, and the second scaling factor comprises a product of (a) a ratio of the second EL spatial dimension value to the second BL spatial dimension value and (b) the predetermined value.

51. The apparatus of claim 49, further comprising means for determining the first scaling factor without performing a division operation and means for determining the second scaling factor without performing a division operation.

* * * * *